No. 766,376. Patented August 2, 1904.

UNITED STATES PATENT OFFICE.

GEORGE B. PAINTER, OF SCHENECTADY, NEW YORK.

AUTOMATIC REVERSING TAPPING-MACHINE.

SPECIFICATION forming part of Letters Patent No. 766,376, dated August 2, 1904.

Application filed January 13, 1900. Serial No. 1,287. (No model.)

*To all whom it may concern:*

Be it known that I, GEORGE B. PAINTER, a citizen of the United States, residing at Schenectady, county of Schenectady, State of New York, have invented certain new and useful Improvements in Automatic Reversing Tapping-Machines, of which the following is a specification.

This invention relates to improvements in nut-tapping and similar machines.

Figure 1:
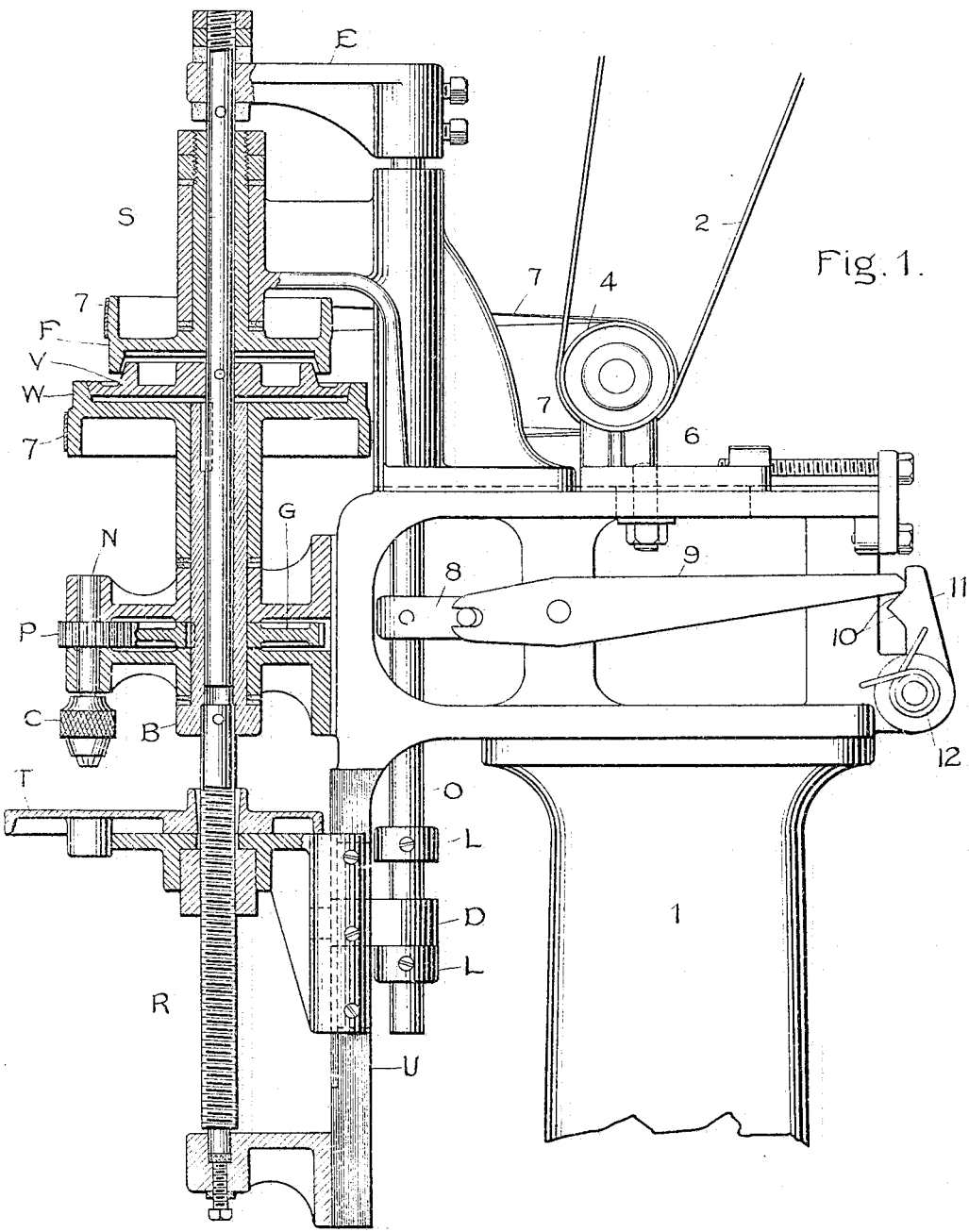
Figure 2:
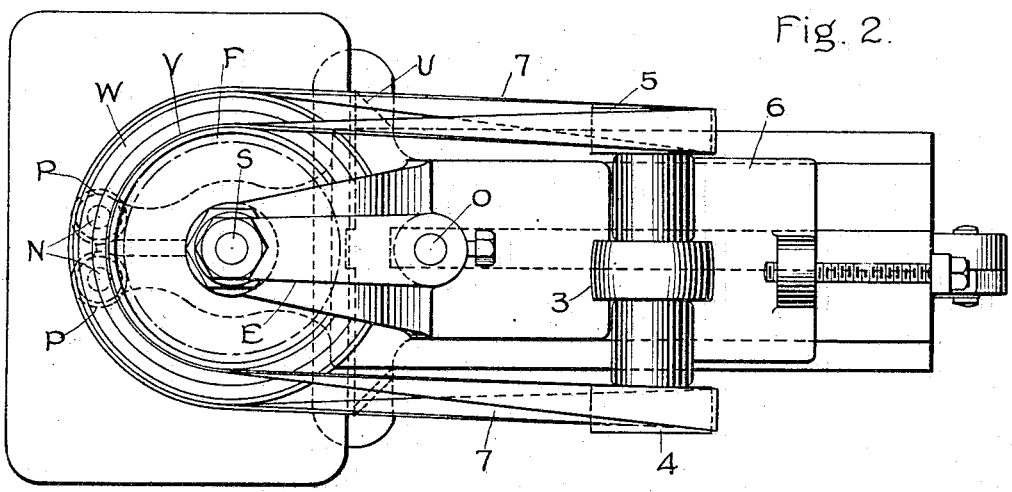
Figure 3:
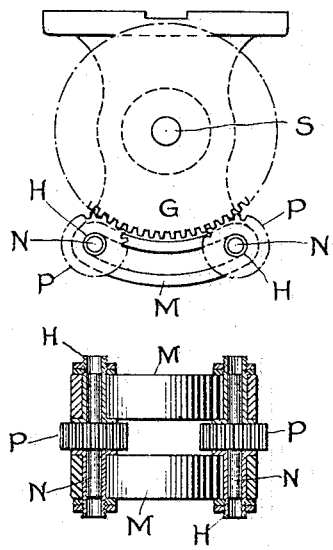
Figure 4:
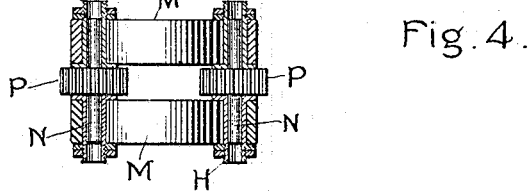

Figure 1 is an elevation, partly in section, of a machine embodying my improvements. Fig. 2 is a plan of the same, and Figs. 3 and 4 are details of means for adjusting the chuck-spindles of the machine.

The main support is indicated at 1, Fig. 1. 2 is the main driving-belt on pulley 3, Fig. 2, which with the pulleys 4 and 5 is mounted on the base 6, adjustable, as shown, for tightening the belt 7, which passes around pulleys 4 and 5 and also around the idler friction-wheels F and W, whereby the latter are continuously rotated in opposite directions with respect to each other. It is generally desirable that these friction-wheels should be of different diameters to effect a quick return under no load. These wheels are suitably mounted in bearings, as shown, so that their only motion is of simple rotation. As the belt 7 passes over both pulleys 4 and 5, only one of them is connected with the driving-pulley 3, the other being loosely mounted.

A shaft S extends through the friction-wheels and carries a wedge or friction contact-wheel V, which is adapted to engage alternately with the wheels F and W. The shaft S carries a sleeve B, to which is keyed a gear G, which drives a pinion P, which is secured to the spindle N of the chuck C, which holds the tap. The chuck C is vertically immovable and simply rotates to engage the work, which is brought up to it by the feeding device or vertically-movable table T.

The shaft S is moved to cause the wheel V to engage the pulleys F and W alternately, and the table T is reciprocated with respect to the chuck C by the following organism.

The sleeve B, on which the gear G is mounted, is keyed to the shaft S, and to this sleeve is secured a screw R, which thus rotates with the shaft S, the movement of which screw controls the movement of the table T, as shown. The table T slides on the guide U and carries a dog D, which abuts alternately against each of the pair of adjustable lugs L, which are secured on opposite sides of the dog D to a rod O. The rod O is connected to move parallel with the shaft S, both being carried by the piece E, in which the shaft S rotates, but with respect to which the shaft is not capable of independent vertical movement. The parts shown with dotted surfaces are composed of any suitable bearing material, such as fiber.

When the dog D engages one of the lugs L, since the screw R continues to turn, the rod O is moved, causing a consequent vertical movement of the shaft S, whereby the wheel V is removed from engagement with one and engages with the other of the wheels F and W, and the shaft S is caused to rotate in the opposite direction, which shaft in turn causes the screw R to turn in the opposite direction until after it has caused the dog D to abut against the other of the lugs L L and caused a reversal of the described operation.

A regulating governor or tension device for the machine includes a lug 8, screwed to the rod O, which lug engages with and moves a pivoted lever 9, which lever engages the faces 10 of a pivoted lever 11, which is constantly pressed toward the lever 9 by a spring 12.

A plurality of chuck-spindles N may be used, and in this case they are made adjustable, as shown in Figs. 3 and 4, wherein bushings H for the spindles N are shown, these bushings being adapted to be clamped by lock-nuts at any part of the segmental guides M. The nuts to be tapped or other work may be fed by hand upon the table T beneath the chucks C, or any suitable automatic feeding device or chute may be used. With this machine more than twenty-five thousand nuts can be tapped in one working day, and it should be noted that the machine requires no manual operation whatever.

What I claim as new, and desire to secure by Letters Patent of the United States, is—

1. The combination of a tool-holder, a shaft adapted to rotate said holder in either direction in a fixed plane, a table, means directly connected to said shaft for reciprocating said table toward and from said holder corresponding to the direction of rotation of said holder, and automatic means for successively changing the direction of rotation of said shaft.

2. The combination of a tool-holder, a shaft adapted to rotate said holder in either direction in a fixed plane, a lead-screw directly connected to said shaft, a table adapted to be reciprocated by said lead-screw, and automatic means for successively changing the direction of rotation of said shaft.

3. The combination of a tool-holder, a shaft arranged parallel to and adapted to rotate said holder in either direction, a lead-screw connected to and in line with said shaft, a table adapted to be reciprocated toward and from said holder by said screw, and means for successively changing the direction of rotation of said shaft.

4. The combination of a tool-holder, a shaft adapted to rotate said holder in either direction, a lead-screw detachably connected to and in line with said shaft, and a table provided with a screw-engaging part and adapted to move toward and from said holder.

5. The combination of a tool-holder, a shaft geared to said tool-holder, a lead-screw detachably connected to and in line with said shaft, a table surrounding said screw and provided with a screw-engaging part and means for successively changing the direction of rotation of said shaft and screw.

6. The combination of a plurality of tool-holders, a shaft arranged parallel to and adapted to rotate said holders in either direction, a table, and means directly connected to said shaft for reciprocating said table toward and from said holders according to the direction of rotation of said holders.

7. The combination of a plurality of relatively adjustable tool-holders, a shaft adapted to rotate said holders in either direction, a table automatically movable toward and from said holders, and means directly connected to said shaft for reciprocating said table.

8. The combination of the tool-holder C, the holder-shaft N provided with a pinion P, the shaft B provided with the gear G meshing with said pinion P, the table T, the lead-screw R engaging said table T and connected at one end to the shaft B, and means for rotating the shaft B in either direction.

9. The combination of the tool-holder C, the holder-shaft N provided with the pinion P, the shaft B provided with the gear G meshing with said pinion P, the longitudinally-movable shaft S feathered in the shaft B, and provided with the friction-disk V, the oppositely-driven friction-wheels F and W adapted to engage said disk V, the table T provided with the projection D, the lead-screw R engaging said table and connected at one end with said shaft B, and the reversing-rod O connected at one end to the reciprocating shaft S and provided with stops L adapted to be engaged alternately by the projection D upon each reciprocation of the table T.

In witness whereof I have hereunto set my hand this 11th day of January, 1899.

GEORGE B. PAINTER.

Witnesses:
BENJAMIN B. HULL,
MABEL E. JACOBSON.